I. J. O'MALLEY.
AUTOMATIC PILOT LIGHT CONTROLLED HEATING APPARATUS.
APPLICATION FILED NOV. 22, 1909.
1,001,883.
Patented Aug. 29, 1911.
3 SHEETS—SHEET 2.
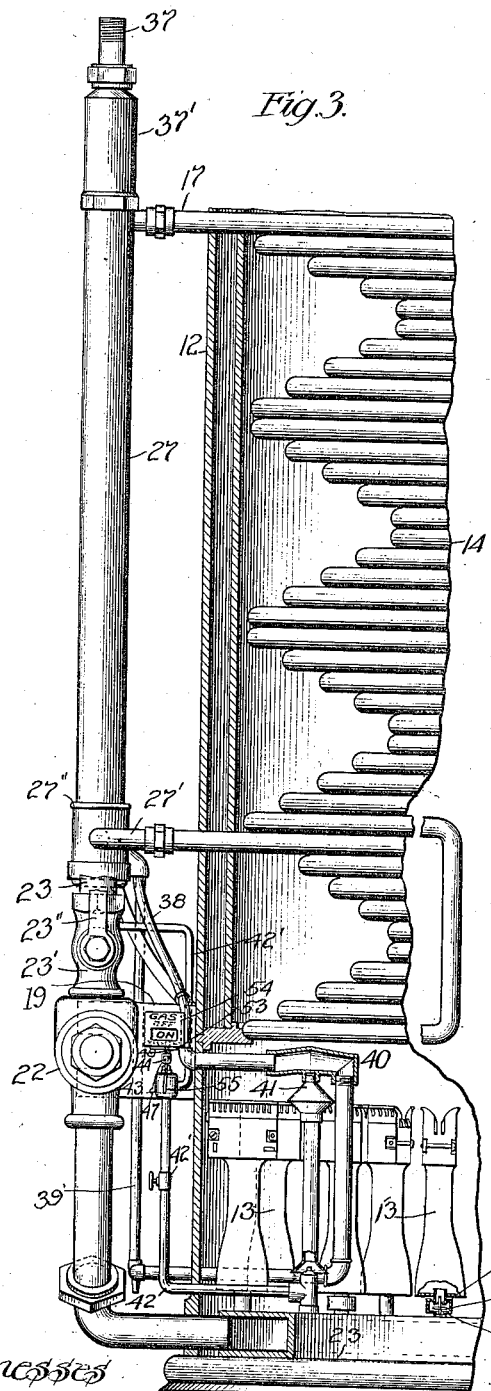
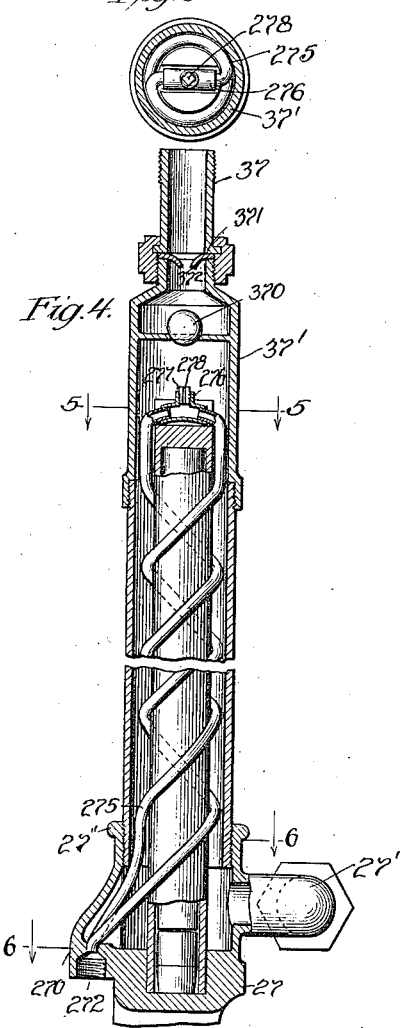
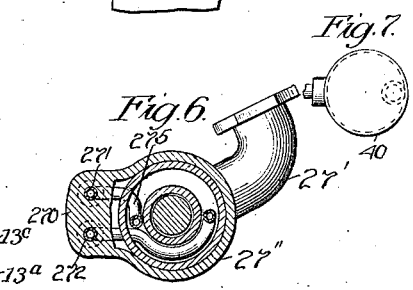

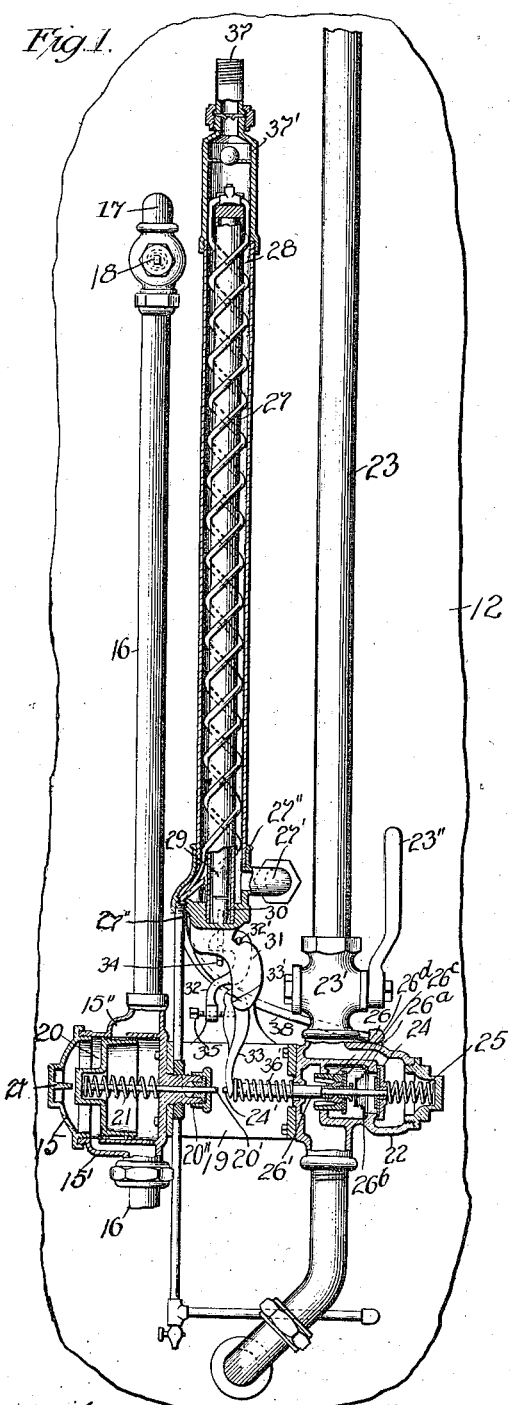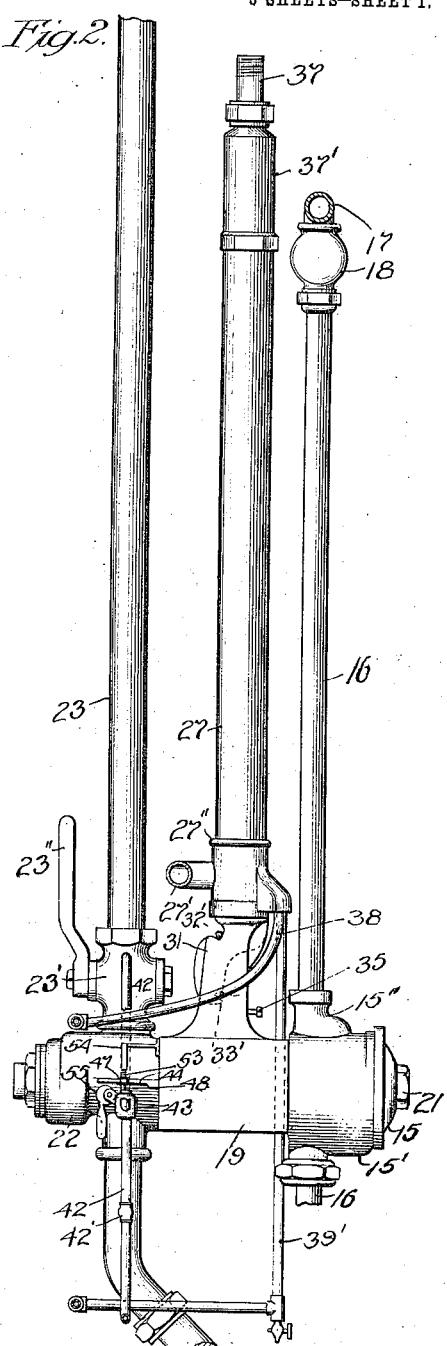

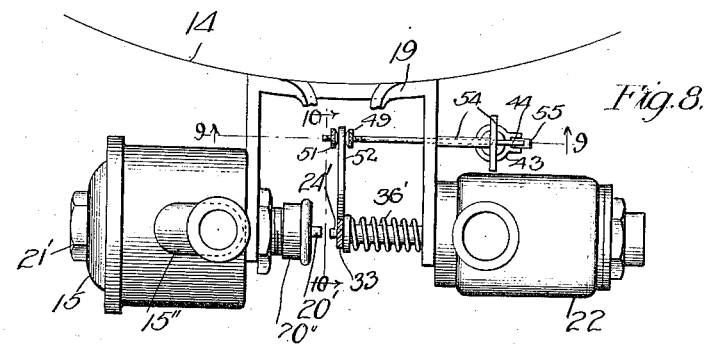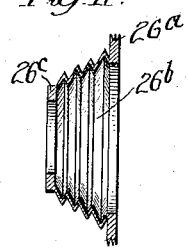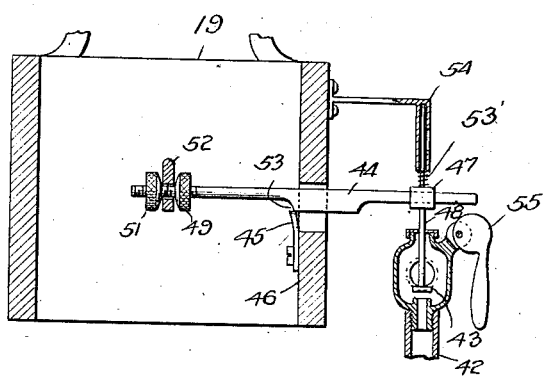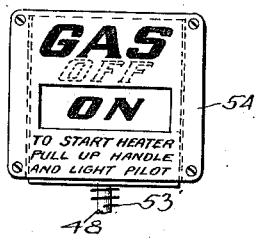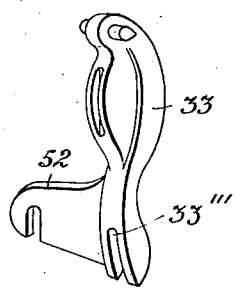

UNITED STATES PATENT OFFICE.

IRA J. O'MALLEY, OF CHICAGO, ILLINOIS.

AUTOMATIC PILOT-LIGHT-CONTROLLED HEATING APPARATUS.

1,001,883.  Specification of Letters Patent.  Patented Aug. 29, 1911.

Application filed November 22, 1909. Serial No. 529,241.

*To all whom it may concern:*

Be it known that I, IRA J. O'MALLEY, a citizen of the United States, residing at Chicago, in the county of Cook and State of Illinois, have invented certain new and useful Improvements in Automatic Pilot-Light-Controlled Heating Apparatus, of which the following is a specification.

This invention relates in general to heating apparatuses using controlled fuel, and is particularly adapted to be used in connection with water heaters which employ a main battery of gaseous fuel burners to heat the water for domestic or other purposes, and a continuously burning pilot light from which the main burners are ignited. In heaters of this character the supply of fuel is ordinarily admitted automatically to the main burners upon the opening of a water faucet and the quantity admitted is regulated by a thermostat valve under the control of a thermostat. Owing to the fact that when the water faucets are all closed the supply of gas to the main burners is automatically cut off, the pilot light gas supply must be independent therefrom, as it is essential that the pilot light be kept burning for the purpose of igniting the main burners when necessary. In this type of heater the ignition of the gas issuing from the main burners, is dependent upon the pilot light, and should the pilot light be extinguished, the gas would escape from the burners in large volumes. This gas which in passing through the burners has been automatically mixed with a certain proportion of air for the purpose of effecting good combustion results in a combustive mixture of an explosive character. Should this explosive mixture escape into the stovepipe and chimney, it would constitute a source of great danger because of the risk of explosion due to possible ignition from other fires that may communicate with the same chimney, or from exposed lights or fire places. Down drafts in the chimney, which might blow the gas mixture back into the house, would still further endanger the lives of the occupants from asphyxiation. From the foregoing the importance of the pilot light in heaters of this kind will be appreciated for the operation of the whole heater is dependent upon the certain ignition of the main gas burners from the pilot light, and upon its failure to so ignite them, great danger to life and property may ensue.

My invention has been designed for the purpose of eliminating such danger due to the extinguishment of the pilot light, thus rendering the operation of the heaters safe and certain under all possible conditions, and it is an object of my invention to provide a simple, positive and reliable means for automatically shutting off the supply of gas to both the pilot burner and the main burners if the pilot light should become extinguished, and for positively locking the cut-off valve for the main burners so that the automatic admission of gas to said burners by the opening of a water faucet, is rendered impossible.

Another object is to provide simple and efficient means by which the fuel supply can be readily turned on to the pilot light by hand and without exposing the person lighting it, to the possibility of an explosion, while at the same time leaving the supply of gas to the main burners closed and under thermostatic control whereby it will be subsequently and automatically admitted to the main burners by the action of the accumulated heat from the pilot burner.

A further object is to provide means for insuring that the initial flow of the gas to the burner battery shall be directed to the burners nearest the pilot light and to govern the flow of gas to said main burners.

Another object is the elimination of what is known as the "circulating thermostat" from heaters of this kind.

Still another object is the direct application of the heat from the pilot light to the thermostat by means of a circulating conducting medium.

Additional objects are to provide a visual indicator which shall denote to the user of the heater whether the gas supply is on or off, and to further improve the general structure and to increase the efficiency of heaters of this character.

Other aims, objects and advantages of my invention will be obvious to those skilled in the art as it becomes better understood by reference to the following description when taken in connection with the accompanying illustration of one specific embodiment thereof, while its scope will be more particularly pointed out in the appended claims.

Referring to the drawings Figure 1 is a sectional elevation showing the thermostat and water and gas valves. Fig. 2 is an elevation of that part of my invention shown in Fig. 1, but looking at the opposite side thereof. Fig. 3 is an elevation looking in the direction of the arrow, Fig. 2. Fig. 4 is an enlarged view, partly broken away, of the thermostat and fitting therefor, shown in Fig. 1. Fig. 5 is a longitudinal section on the line 5—5 of Fig. 4. Fig. 6 is a section on the line 6—6 of Fig. 4. Fig. 7 is a plan of the cap over the pilot burner. Fig. 8 is a plan view of the water and gas valves and shows the relation of the locking mechanism thereto. Fig. 9 is a section on the line 9—9 of Fig. 8. Fig. 10 is a view of the thermostat lever 33 and connected parts taken on the line 10—10, Fig. 8. Fig. 11 is an enlarged section of the auxiliary valve seat for the thermostat valve. Fig. 12 is an elevation of a preferred form of visual indicator for indicating the position of the shut-off valves.

My invention is capable of application to water heaters of various kinds, known as automatic heaters, which may be connected up in any one of several well-known ways. One way is to supply them with "dead cold water", meaning water at a very low temperature direct from the house supply pipe. Another, and very customary way is to connect them in a "reheating" or "supplementary system", in which the heater is supplied with water from a tank heated from independent means such as a furnace coil, for instance. The water from such a tank will be supplied to the automatic heater at varying temperatures, both above and below that for which the thermostat on the automatic heater is set. If water at a temperature at or above that for which the thermostat is set, is supplied to the heater, the said thermostat will be expanded by the passage of such heated water, and by its expansion will shut off the gas to the heater burners, thereby permitting the passage of such heated water to the faucet through the heater without the consumption of any gas. If, however, the temperature of the water admitted is below that for which the thermostat is set, the contraction of the thermostat tube will automatically turn on the gas and the running water will be heated to the desired temperature.

Referring now more particularly to the drawings wherein I have shown the invention embodied in a well-known water heater, the jacket 12 surrounds and incloses a battery of main gas burners 13, of any preferred type, and a superposed water coil 14. The cold water inlet pipe 16 which connects with the upper end of the coil at 17, has interposed therein a water valve 15 and is provided with a cock 18 for regulating the flow of water. The water valve is mounted on a bracket 19 attached to the jacket and is provided with an inlet port 15′ and an outlet port 15″ and a plunger 20, Fig. 1. The stem 25 of the plunger projects through a stuffing box 20″, and a spring 21 is arranged on the stem to hold the plunger against the end stop 21″ and closing the outer port. The main gas supply pipe 23 is provided with a manually controlled shut-off 23′ adapted to be operated by handle 23″ and a valve casing 22 which contains a main gas valve 24 normally held in closed position by the spring 25, and a thermostat gas valve 26 normally open. Into the valve seat 26ᵃ against which the main gas valve 24 is adapted to seat, is threaded an extensible and resilient valve seat 26ᵇ which projects inwardly from the seat 26ᵃ, and is provided at its inner end with a seat 26ᶜ against which the back face 26ᵈ of the thermostat valve 26 is adapted to seat when said valve is opened to an abnormal position. This valve seat is made resilient and expansible to obviate breakage of any part of the thermostat system when under extraordinary conditions the thermostat tube should become contracted to an amount greater than that necessary to seat the face 26ᵈ against the seat 26ᶜ. In the construction above described, if such undue contraction of the thermostat tube should occur, the seat 26ᵇ would yield under the pressure of the thermostat valve, sufficiently to obviate any danger of breakage of any of the parts of the mechanism. The stem 24′ of the main gas valve extends through the hollow stem 26′ of the thermostat valve and both stems project through the inner end of the valve casing 22 with a stem 24′ arranged in alinement and opposition to the stem 25 of the water valve, and separated a short distance therefrom.

The main burners 13 are preferably arranged on a burner ring, comprising an inner and outer circle with the pilot located in proximity to the burners nearest the gas inlet. Ordinarily in constructions of this kind when gas is turned on to the main burners it will flow to all of them in equal quantity, and considerable gas will escape from the burners farthest from the pilot light before they will become lighted, thereby causing a "delayed ignition" or slight explosion. I have overcome this objectionable feature by interposing at the base of each of the main burners more remote from the pilot burner, a small gas governing check valve 13ᵃ. These governing valves are adapted to rest normally on the seats 13ᵇ over the inlets from the main gas pipe. Should the gas pressure become so high that more gas would be fed through the burners than could be consumed, the governing valves would be raised by the gas pressure to rest against the downwardly extending lugs 13ᶜ at the top of the valve casings. The apertures between these lugs are only large enough to admit what gas the burners can consume; as a result an excessive gas pressure will automatically cut down to the proper amount the quantity which will be permitted to flow to the burners. Preferably the three burners nearest the pilot burner are not supplied with governing valves. The initial flow of gas which is under comparatively slight pressure, will be insufficient to open the governor valves, and will consequently be admitted only to the burners nearest the pilot light, and not until the pressure becomes sufficient to open the valves in the base of the remaining burners, will the gas be admitted thereto. In this manner the gas will first be supplied to the burners nearest the pilot light, and they will become ignited and subsequently when the gas pressure is sufficient to open the governor valves in the other burners, gas will be admitted and they will be lighted from the already ignited burners nearer the pilot light. In case of a small leakage of gas to the main burners, these governor gas valves will insure that such gas will be consumed in the burners, immediately affecting the pilot cap so that all the heat will be focused thereon, consequently, the thermostat will be more rapidly heated and will act more quickly to automatically shut off such escaping gas.

A thermostat comprising a casing 27 (Figs. 1 and 4) and a tube 28 having a relatively high co-efficiency of expansion closed at its upper end arranged within the outer tube and screwed into the fitting 27" at the lower end of the outer tube, is connected by a branch 27' to the outlet of the hot water coil in the heater. A rod 29, preferably of porcelain, but which may be composed of any material having a relatively low co-efficiency of expansion, is located within and is secured to the closed upper end of the expansion tube 28. The porcelain rod is provided at its lower end with a pin 30, which extends through the fitting 27" at the lower end of the outer tube 27. This fitting has two parallel downward projections 31 on which the thermostat levers 32 and 33 are fulcrumed at 32' and 33', respectively. The lever 32 has an adjusting screw stop 35 to engage the lever 33. The lower end of the lever 33 is slotted as at 33''', Fig. 10, and engages a collar 33" on the stem 26' of the thermostat gas valve 26. A spring 36' is arranged on the stem 26' between said collar 33" and the gas valve casing 22. The upper end of the outer tube of the thermostat is connected with a hot water pipe 37 through a fitting 37'. This fitting is provided preferably with a ball check valve 370. The purpose of this check valve is to prevent back flow of water through the thermostat, due to the ordinary ebb and flow of water in the pipes, or other causes, which would tend to reduce the temperature of the thermostat coil and tube and cause untimely contraction of the tube. A washer 371 secured in the top of the fitting, has downwardly projecting prongs 372 which prevent the passage of the ball up into the outlet pipe 37 along with the running water.

As is best shown in Figs. 4 and 6, the fitting 27" is laterally extended at 270 to provide a plurality of fittings 271 and 272, into which are adapted to be screwed the two pipes 38 and 39 respectively. A small copper tube 275 is attached at one end to the fitting 271 and extends upwardly and spirally around and in proximity to the tube 28, over the top thereof, and spirally downward around the tube to the fitting 272 in which its other end is secured. At the top of this small spirally coiled tube where it crosses the expansion tube, it is provided with a tap 276 into which is secured a small plug 277 provided with an opening 278 to accommodate the expansion and contraction of the fluid within the tube. The upper end of the expansion tube 28 is extended to form two parallel lugs between which the small copper tube rests and is supported. The pipe 39' extends downwardly laterally, as shown in Fig. 3, and then upwardly and is connected to a cap 40 over the pilot burner 41. This cap, which is hollow, is circular in shape, as shown in Fig. 7, and has attached to one side thereof, the lower end of the pipe 38. It will be evident that the cap 40, the pipe 38, the fitting 27", the small copper tube 275 and the pipe 39, constitute when filled with fluid, a fluid system in which, when the fluid is heated by the pilot light, a circulation is set up. This system will be hereinafter referred to as a circulating system. This circulating system, as will be evident, comprises a substantially closed system in which the water flows in a circuit and is used over and over again. This feature of using this same water repeatedly in the circulating system, is very advantageous in those localities where the heater is used with "hard" water, because the small tubes are not apt to be stopped up with mineral deposits as they would be if a new supply of hard water were continually admitted thereto. This circulating system eliminates from the heater the ordinary "circulating thermostat", which is designed to permit a circulation of the water through the heating coils and thermostat in case the main burners remain lighted when the faucets are closed, which condition sometimes arises if the main water valve fails to close for any reason. Under the foregoing conditions the main gas valve permits gas to flow to the main burners, thus heating and setting up a circulation through the heating coils and thermostat, thereby expanding the thermostat until it closes the thermostat valve and cuts off the gas. In my invention should the main burners fail to be extinguished when the faucets are closed, the combined heat of the main and pilot burners acting on the pilot cap and the pipe leading therefrom, quickly heat up the thermostat and thereby cut off the gas more promptly and effectually than it would ordinarily be cut off by the circulating thermostat. The use of a cap over the pilot light in connection with a thermostat coil surrounding the thermostat tube, insures the direct transmission and application of the heat from the pilot light to the thermostat.

The pilot burner 41, (Fig. 3) is supplied with gas through a pipe 42, which is connected with the main gas pipe 23. The pipe 42 is provided with a cut-off cock 42' and a starting valve 43 which when closed shuts off the supply of gas to the pilot light. This valve, shown in Fig. 9 as open, is normally held in that position by a locking bar or rod 44, which rests upon a stop plate 45, secured upon the bracket 46, and extends through a collar 47 fastened to the top of the valve stem 48. The inner end of the locking bar is threaded for the reception of locking nuts 49 and 51, which secure the bar to a projecting lug or lateral extension 52 of the thermostat lever 33. Upon abnormal movement of the lever 33 to the right (Figs. 1 and 9) caused by excessive contraction of the thermostat tube the locking bar 44 will slide along the plate 45 until its shoulder 53 is forced down behind the locking plate 45 under the influence of the spring 53, surrounding an extension of the stem 48, and interposed between the collar 47, and the frame of a visual indicator 54. This indicator may be of any preferred construction, but I have deemed it advisable to provide it with characters whereby the person operating the heater, by glancing at the indicator, is enabled to ascertain whether the gas supply is on or off. It is also preferably provided with directions for restarting the heater, plainly visible in a convenient and accessible position. When the thermostat lever 33 is moved to the right sufficiently to permit the shoulder 53 of the bar 44 to drop down behind the locking plate 45, the valve 43 will be closed, thereby cutting off the gas supply to the pilot burner. The thermostat valve 26 being governed by the lever 33 will simultaneously be moved into position to bring its face 26ᵈ into engagement with the face 26ᶜ of the resilient seat 26ᵇ, thereby positively shutting off the supply of gas to the main burners. The engagement of the shoulder on the locking bar 44 with the locking plate 45 will prevent the return movement of the thermostat lever 33 until the locking bar has been raised to disengage it from the locking plate. A simple but efficient means for unlocking the valve is shown in the form of a cam 55, mounted upon the casing of the valve 43, and so positioned relatively to the bar 44 that when the cam surface is rotated it will engage the underside of said lever and raise it, thereby opening the starting valve 43 and lifting the shoulder 53 above the locking plate 45, where it will be retained by the frictional engagement of the lever 44 and the cam 55. This operation admits gas to the pilot burner and it may be relighted. The valve 26, however, is still retained in engagement with the seat 26ᶜ by the lever 33, and not until the thermostat tube becomes partially expanded under the influence of the circulating system heated by the pilot light, will the lever 33 be permitted to move outwardly and thereby allow the valve to unseat from the face 26ᶜ, so that the gas may be admitted to the main burners. The outward movement of the lever 33 and with it the locking bar 44 will withdraw said bar from engagement with the cam 55 which will then return to normal position under the influence of gravity.

In the normal operation of my invention, assuming all the water faucets to be closed, the main burners are extinguished and the pilot light is burning, thereby heating the fluid circulating system and maintaining the thermostat expansion tube at an approximately constant temperature. In other words the thermostat is under the control of the pilot light, and the thermostat valve will be maintained partially open and in neutral position between its seats. As soon as water is drawn through the heater, the flowing water around the thermostat tube absorbs any surplus heat from the thermostat coil, and as a result the thermostat will be influenced primarily by the water flowing from the heater through the thermostat case. This will continue as long as water is drawn from the heater. When the faucet is shut off the gas supply to the main burners will be automatically shut off and control of the thermostat will again be assumed by the pilot light. As will be evident, the control of the thermostat is automatically assumed alternately by the water supply heated from the main burners and the circulating system heated from the pilot burner. This independent and non-conflicting control of the thermostat by the pilot light and main burners, I believe to be novel, for in so far as I am aware the application of heat directly from the pilot light to the thermostat, which is also controlled by the main burners, and the provision of means whereby control of the thermostat may be alternately assumed by the main and pilot burners, has never been accomplished. Furthermore, by employing only one thermostat controlled from both the main and pilot burners, the same thermostat which governs the heater in its normal position is brought into action to shut off the gas supply in case of emergency, and since this thermostat must be in operative condition in order to control the normal operation of the machine, it can be depended upon to act with reliability in case of emergency. Assuming now that with the faucets closed the pilot light becomes extinguished or the flame is reduced to such an extent that it is insufficient to properly ignite the main burners if gas should be turned on, the thermostat tube thereupon contracts and through the intermediary of the thermostat levers seats the thermostat valve against the resilient seat $26^b$ and at the same time slides the locking bar 44 along the locking plate 45 until the shoulder 53 is engaged behind said plate. This locking movement of the bar securely locks the thermostat valve against its seat $26^b$ and simultaneously closes the starting valve 43. The gas supply to both the main and pilot burners is now effectually cut off. Even if the main gas valve 24 should be opened by turning on the water or if the thermostat should be heated up by passing hot water through, as might occur in case the heater is connected in a supplementary system, as previously explained, the gas can not escape to the burners past the seated and locked thermostat valve. It is only by manually raising the locking lever and relighting the pilot light, thereby permitting it to resume control of the thermostat and restore it to normal condition, that the thermostat valve will permit gas to be admitted to the main burners. Thus, by positively locking both the shut-off and starting valves in closed position as soon as they assume that position, I obviate the possibility of explosions and other dangers due to escaping gas either from the main or pilot burners, and by leaving the shut-off valve in closed position to be automatically opened under the influence of the pilot light, I insure that the pilot light must be burning before any gas can be admitted to the main burners.

While I have shown and described a specific embodiment of my invention, various changes may be made in this practical form, it being understood that its invention is generic and contemplates other means than those shown and described.

What I claim and desire to secure by Letters Patent is:

1. In a water heater, the combination of a main burner, a pilot burner, means for supplying gas to said main and pilot burners, a thermostat arranged to control the supply of gas to said burners, heat conducting connections between the thermostat and said main burner, and heat conducting connections between the thermostat and said pilot burner, whereby the thermostat is controlled independently by the main and pilot burners.

2. In a water heater, the combination of main burners, a pilot burner, means for supplying gas to said main and pilot burners, a thermostat, a fluid system connected with the thermostat and adapted to be heated by the main burners, and an independent fluid system connected with the thermostat and adapted to be heated by the pilot burner, whereby the thermostat may be controlled independently by the main and pilot burners.

3. In a water heater, the combination of a main water supplying system, a main burner for heating said system, an independent circulating system, a pilot burner adapted to heat said system, a thermostat adapted to be influenced by both the main and circulating systems, and independent means controlled by the thermostat for regulating the supply of gas to said main and pilot burners respectively.

4. In a water heater, the combination of a plurality of main burners, a pilot burner, means for supplying gas to said burners, a main water-heating coil adapted to be heated by the main burners, a thermostat, a thermostat-influencing coil adapted to be heated by said pilot burner, and means controlled by said thermostat for shutting off the gas supply to both the main and pilot burners when the thermostat-influencing coil fails to maintain the thermostat at a predetermined temperature.

5. In a water heater, the combination of a plurality of main burners, a pilot burner, means for supplying gas to said burners, a main water supply system adapted to be heated by said main burners, a circulating system adapted to be heated by said pilot burner, a thermostat adapted to be influenced by both the water supply and circulating systems, and means controlled by said thermostat for automatically cutting off the supply of gas to both the main and pilot burners upon extinguishment of the pilot light.

6. In a water heater, the combination of a plurality of main burners, a pilot burner, means for supplying gas to said burners, a water supply system adapted to be heated by said main burners, a circulating system adapted to be heated by said pilot burner, a thermostat adapted to be influenced by both the water supply and circulating systems, mechanism controlled by said thermostat for positively cutting off the supply of gas to both the main and pilot burners when the pilot light is extinguished, and means for automatically locking the cut off mechanism in closed position.

7. In a water heater, the combination of a pilot burner, a gas supply pipe leading thereto, a thermostat, a thermostat-influencing coil disposed around said thermostat, heat conducting connections from said coil to the pilot burner whereby the coil is heated by said pilot burner, and means controlled by said thermostat for shutting off the gas supply to said pilot burner upon extinguishment of the pilot light.

8. In a water heater, the combination of a main burner, a pilot burner, means for supplying gas to said burners, a thermostat, a circulating fluid system having one portion thereof coiled around the thermostat and disposed adjacent the pilot burner whereby the heat from the pilot burner is conducted directly to the thermostat, and means controlled by said thermostat for shutting off the gas supply to both said main and pilot burners upon extinguishment of the pilot light.

9. In a water heater, the combination of a main burner, a valve for controlling the supply of gas thereto, a pilot burner, a starting valve adapted to shut off the supply of gas to said pilot burner, a thermostat normally influenced by both the main and pilot burners, means controlled by said thermostat for closing both gas supply valves and means for locking them in closed position upon extinguishment of the pilot light.

10. In a water heater, the combination of a main burner, a pilot burner, a thermostat, a circulating system comprising a coil operatively connected with said thermostat and adapted to be heated by said pilot light, for influencing said thermostat, and means controlled by said thermostat for automatically cutting off the supply of gas to the pilot burner and the main burner when the pilot light is extinguished.

11. In a water heater, the combination of a pilot light, a gas supply pipe therefor, a thermostat located in the main water system, a circulating system comprising a coil surrounding said thermostat and adapted to be heated by the pilot light for influencing said thermostat, means controlled by said thermostat for automatically cutting off the supply of gas to the pilot light and a visible indicator to denote whether the gas is on or off.

12. In a water heater, in combination, a plurality of main burners, a pilot burner, independent gas supply pipes for the main and pilot burners, a cut-off valve in each of said gas supply pipes, means under the control of the pilot light for automatically closing said shut-off valves and locking them in closed position when the pilot light is extinguished, and release means for opening the pilot light cut-off and unlocking without opening the main gas cut-off valve.

13. In a water heater, the combination of main burners, a pilot burner, gas supply pipes connected to said main and pilot burners, an independent cut-off valve for each of said supply pipes, a thermostat, means controlled by said thermostat for automatically closing said valves, a locking device for locking said valves in closed position, manual means for opening said pilot cut-off valve and simultaneously unlocking the main gas supply valve, and yielding means for preventing the opening of said main gas supply valve until subsequent to the lighting of said pilot burner.

14. In a water heater, in combination, a pilot burner, a plurality of main burners arranged at varying distances from the pilot burner, individual gas pipes for the main and pilot burners, a pilot cap over said pilot burner, a thermostat, a heat conducting connection between said thermostat and said pilot cap and means for insuring that any small flow of gas to the main burners shall be directed to the burners nearest the pilot light whereby the heat from said burners will be focused upon the pilot cap.

15. In a water heater, the combination of a pilot burner, a pilot cap, a thermostat, a circulating system connecting said cap and thermostat, a plurality of main burners varying in distance from said pilot burner, and means for preventing gas under low pressure from being admitted to the main burners except those nearest the pilot burner whereby the thermostat will be influenced through the pilot cap by the main burners nearest the pilot burner.

16. In a water heater, in combination, a pilot burner, a plurality of main burners varying in proximity to said pilot burner and adapted to be ignited from said pilot burner, a gas supply pipe for said burners, a thermostat connected with said pilot burner and a governing valve interposed between the main gas supply pipe and each of the main burners except those immediately adjacent the pilot light, whereby any small flow of gas to the main burners will be conducted to the burners nearest the pilot light to influence said thermostat.

17. In a water heater, the combination of a thermostat, a casing surrounding said thermostat, a thermostat-influencing coil disposed within the casing, a fitting into which said casing is threaded provided with an inlet opening for the main water supply and a plurality of openings adapted to be connected to said thermostat-influencing coil, and circulating pipes connected with said openings.

18. In a water heater, the combination of a thermostat, a casing for said thermostat, a fitting secured to one end of said casing, said fitting being provided with inlet and outlet openings, a coil disposed within the casing around said thermostat and having each end connected with one of said openings, a pilot light, a hollow cap disposed thereover, and tubes connecting said cap with the inlet and outlet openings in said fitting whereby a circulation of liquid may be maintained through said coil, tubes and pilot cap, by the heat from the pilot light.

19. In a water heater, the combination of water heating coils, a thermostat connected therewith, a coil disposed around said thermostat, a casing surrounding said coil, a fitting provided with openings into which either end of said coil is secured, a pilot light cap and pipes connecting said cap with the openings in said fitting to establish a circulating system from the pilot light cap to the thermostat.

20. In a water heater, in combination, a main water supply system, a thermostat interposed in said system and adapted to be influenced thereby, a circulating system surrounding said thermostat, and also exerting influence thereon, a main burner for heating said main water supply system, a pilot burner adapted to heat said circulating system, and means controlled by the thermostat for shutting off the gas from said main burners when the pilot light has been extinguished.

21. In a water heater, the combination of a plurality of main burners, a pilot burner, a thermostat adapted to be influenced by both said main and pilot burners, a valve disk controlled by the thermostat for regulating the supply of gas to the main burners, and a resilient accordion valve seat against which one face of the valve disk is adapted to seat to positively shut off the supply of gas to the main burners when the pilot light is extinguished.

22. In a water heater, the combination of a plurality of main burners, a pilot burner, a thermostat adapted to be influenced by both said main and pilot burners, a plurality of thermostat levers under the control of the thermostat, a thermostat valve connected to said thermostat levers for normally regulating the supply of gas to the main burners, and comprising a valve disk provided with a double faced seat, and a flexible valve seat against which one face of the valve disk is adapted to seat to positively shut off the gas supply to the main burners upon abnormal movement of the valve disk, caused by the thermostat when the pilot light is extinguished.

23. In a water heater, the combination of a battery of main burners, a pilot burner, a thermostat, connections from said pilot burner to said thermostat, means adapted to carry heat from the main burner to the thermostat, a thermostat valve for normally regulating the supply of gas to the main burners and adapted upon abnormal movement to positively shut off the gas supply to said burners, means controlled by said thermostat for actuating said valve, and means for locking the valve when it has been moved to closed position due to the extinguishment of the pilot light.

24. In a water heater, in combination, a battery of main burners, a pilot burner, a thermostat, a circulating system adapted to be heated by said pilot light, comprising a heating cap over the pilot light, a thermostat-influencing coil surrounding said thermostat and connections between said coil and said pilot cap, all constructed and arranged so that upon extinguishment of the main burners, control of the thermostat is assumed by the pilot burner, and means under the control of the thermostat adapted upon the extinguishment of the pilot light to positively shut off the supply of gas to both the main and pilot burners.

25. In a water heater, the combination of a main water valve, a main gas cut-off valve, a thermostat valve adapted under normal conditions to regulate the supply of gas for heating the water supply, and under abnormal conditions to act as a positive shut-off valve, a thermostat controlling the movement of said thermostat valve, a circulating system including a coil surrounding the thermostat for influencing said thermostat, and a pilot light for heating said system, all constructed and arranged so that the extinguishment of the pilot light, acting through the thermostat, positions the thermostat valve to positively shut off the gas supply.

26. In a water heater, the combination of a plurality of main burners, a thermostat, connections between said thermostat and main burners, whereby the thermostat is controlled by the main burners when they are lighted, a pilot burner, and liquid confining means connecting said pilot burner and thermostat, whereby the pilot burner automatically assumes control of the thermostat upon the extinguishment of the main burners.

27. In a water heater, the combination of a plurality of main burners, a thermostat, a main water heating coil connected to said thermostat and adapted to be heated from said main burners, a pilot light, a circulating system including a thermostat-influencing coil adapted to be heated by said pilot burner and means actuated by said thermostat for controlling the supply of gas to said main and pilot burners.

28. In a water heater, in combination, a plurality of main burners, a pilot burner, a starting valve adapted to shut off the supply of gas to the pilot burner, means for automatically closing said valve and locking it in closed position and starting means for unlocking and opening said valve and subsequently permitting the admission of gas to the main burners after the pilot light has been relighted.

29. In a water heater, in combination, a plurality of main burners, a thermostat valve controlling the supply of gas thereto, means for automatically locking said valve in closed position, a pilot light, a starting valve adapted to shut off the supply of gas thereto, and manual means for unlocking and opening said starting valve and releasing said locking means, whereby gas may be admitted to the main burners after the pilot burner has been relighted.

IRA J. O'MALLEY.

Witnesses:
I. J. WILSON,
G. E. HOLMES.